Figure 7:
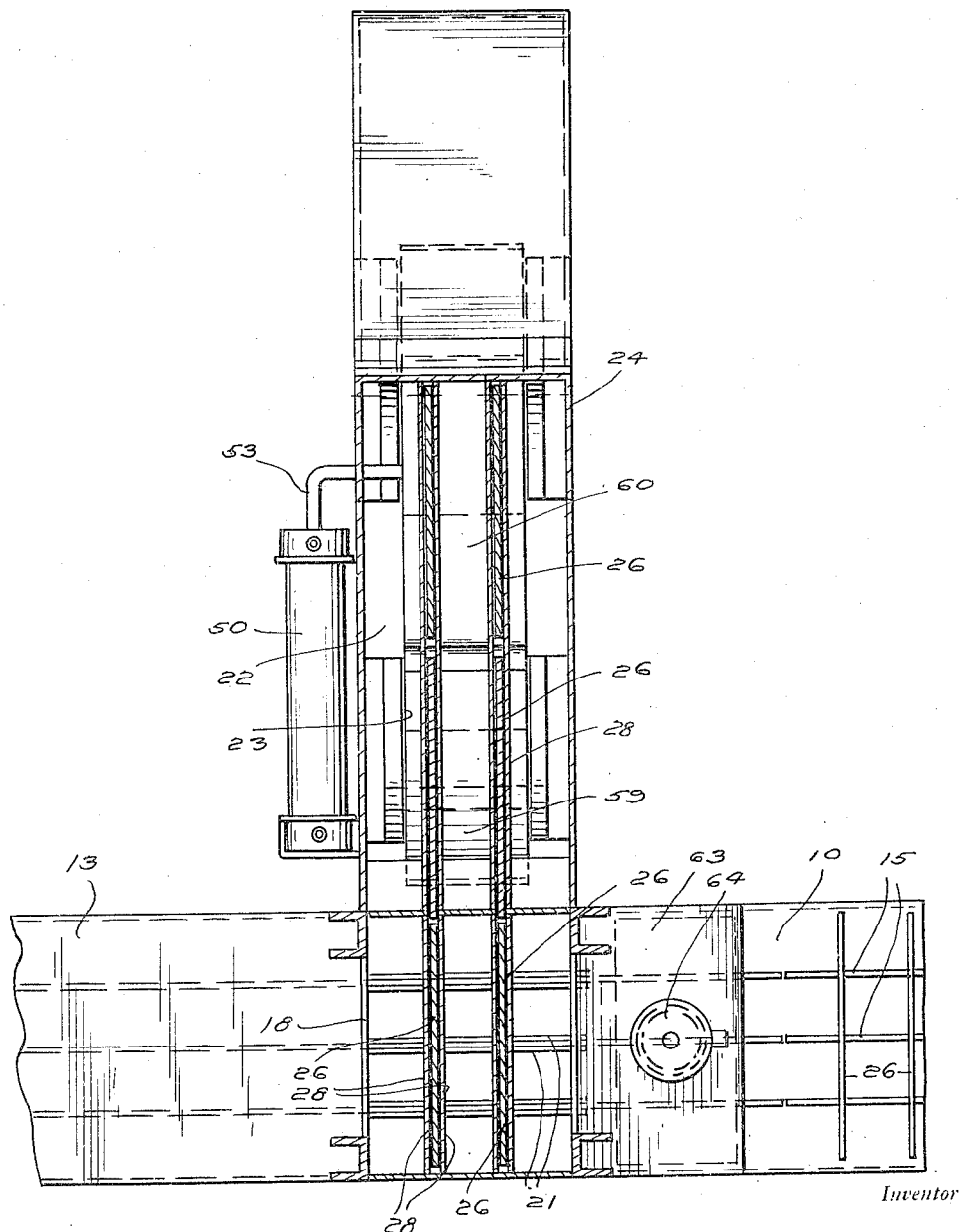

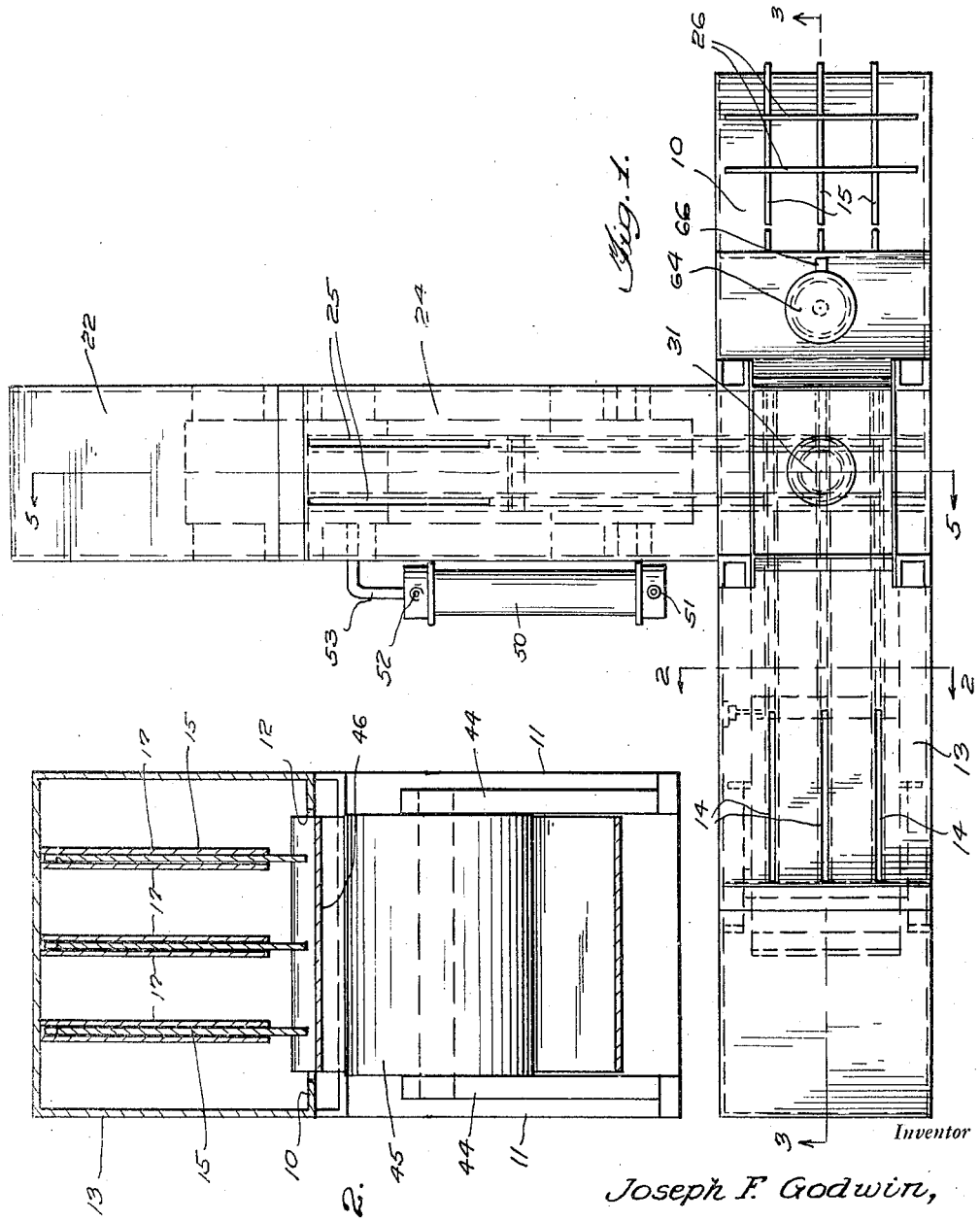

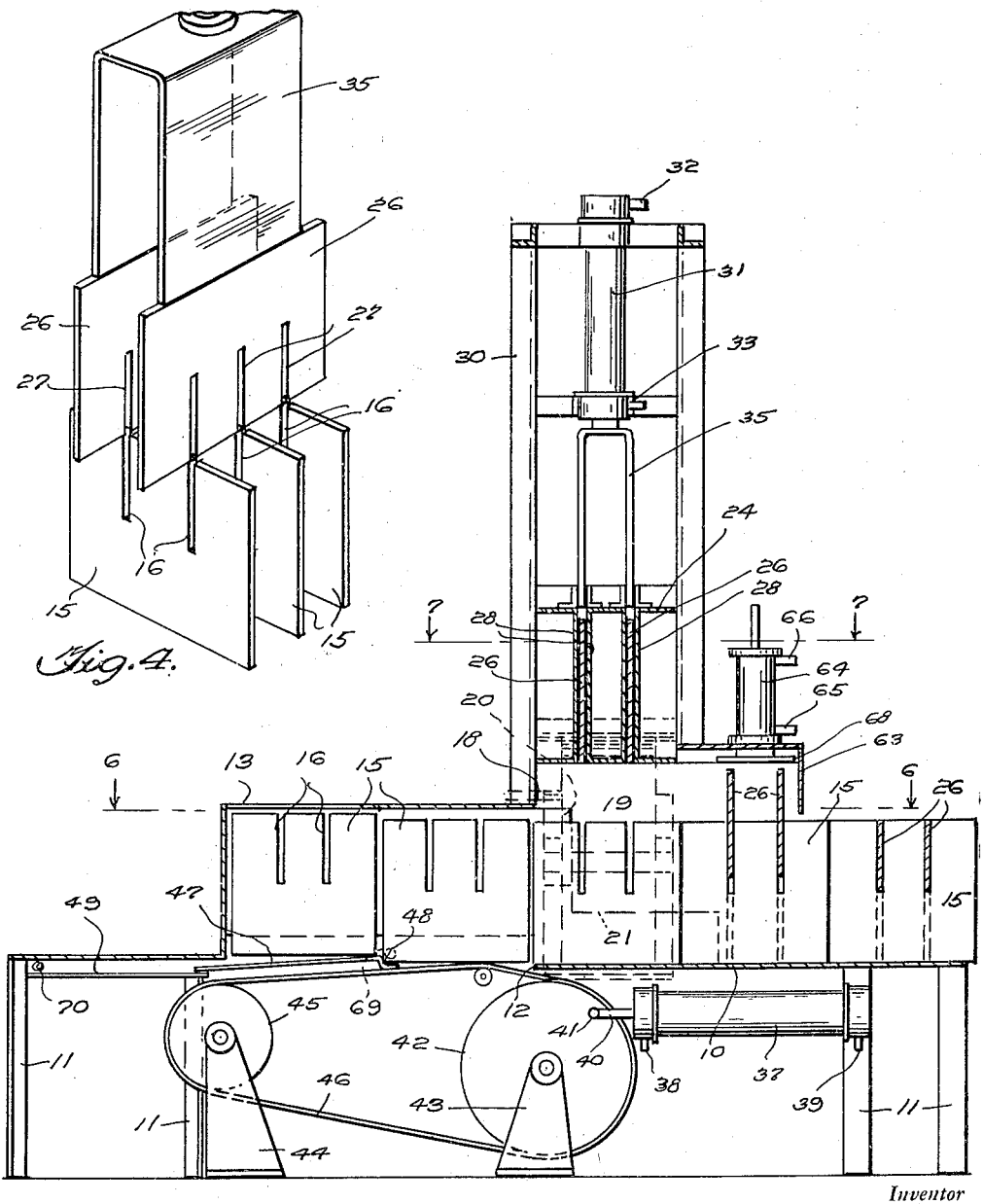

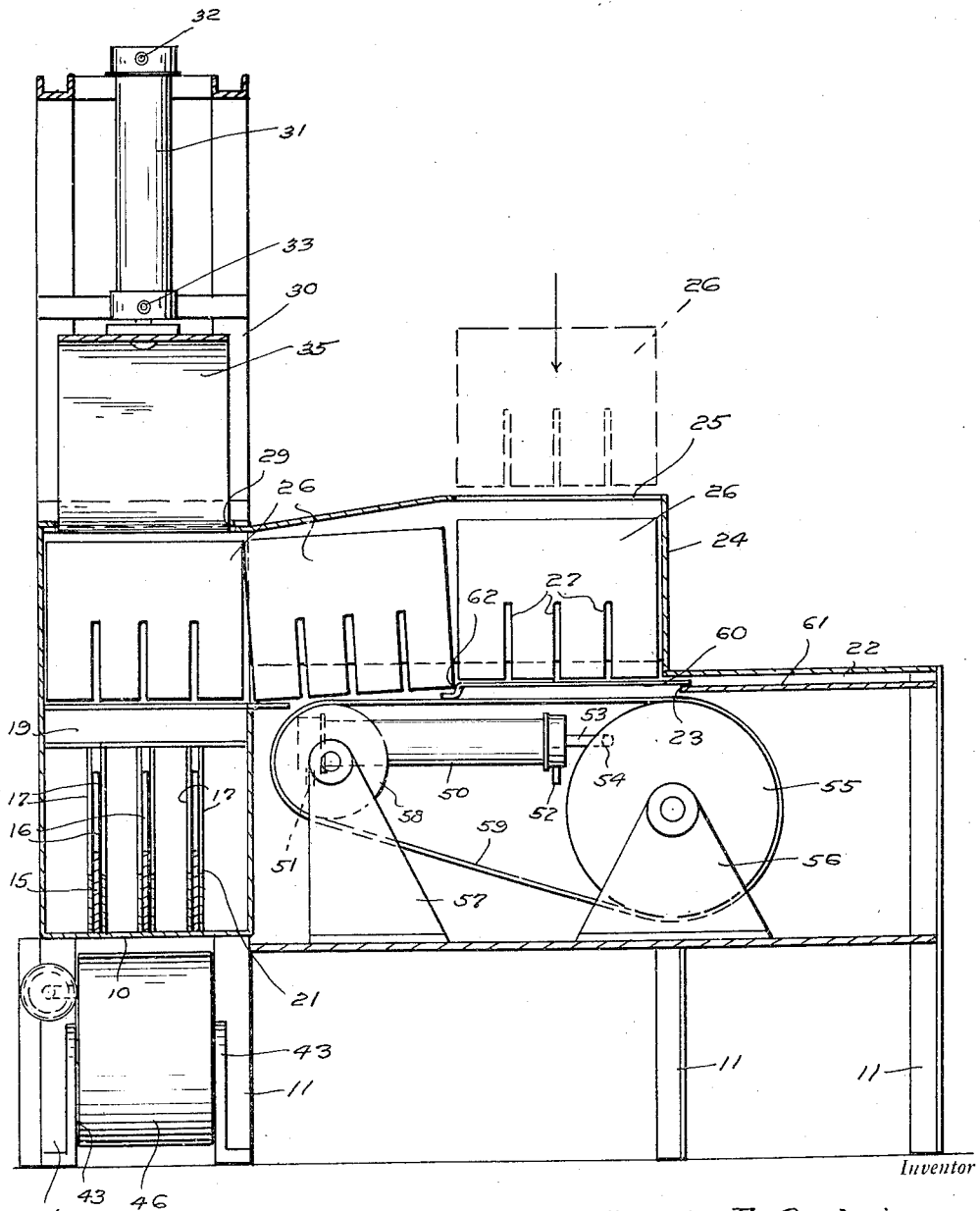

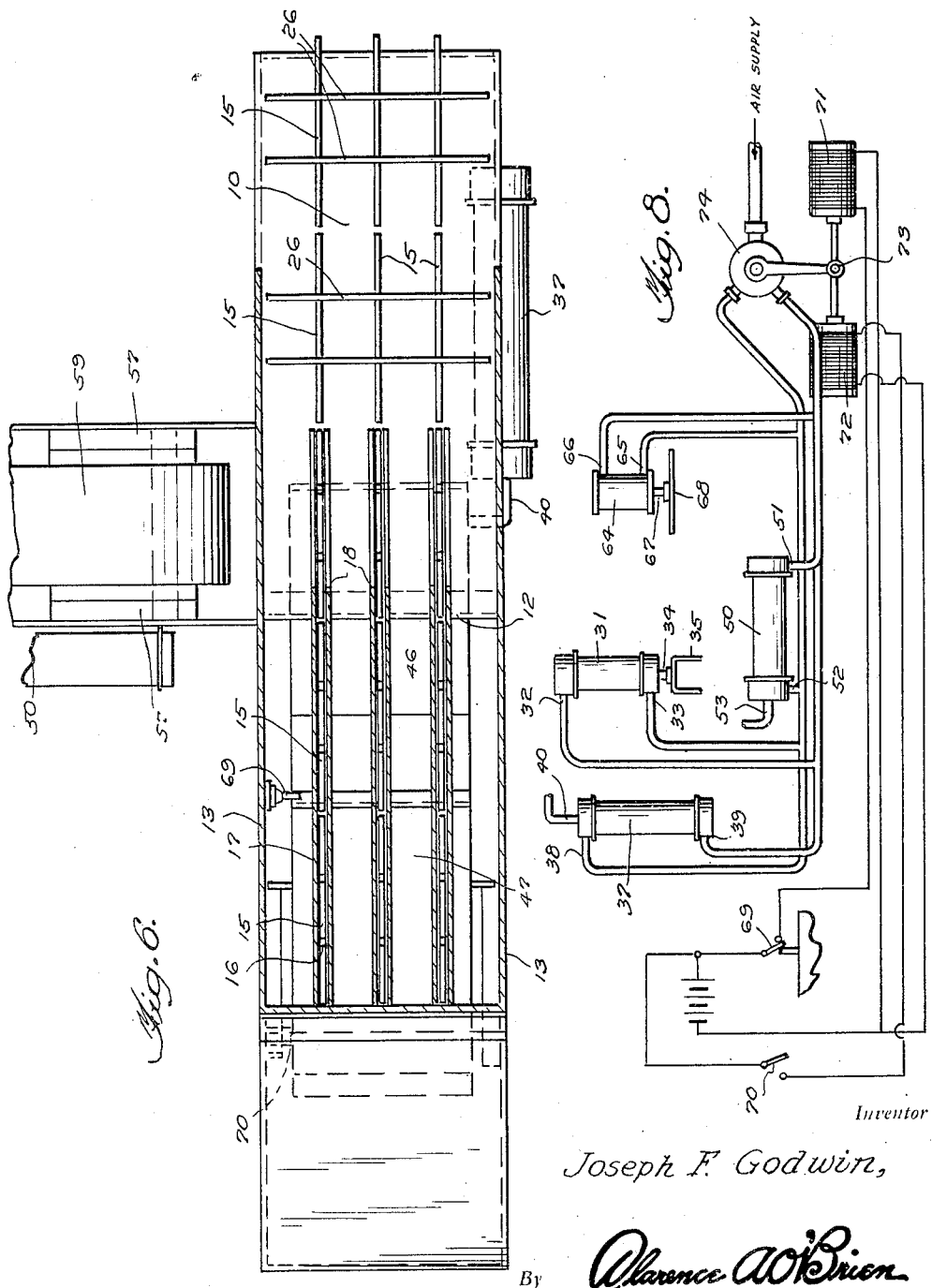

Patented Jan. 3, 1950

2,493,243

UNITED STATES PATENT OFFICE 2,493,243

METHOD AND APPARATUS FOR FORMING CELLULAR STRUCTURES

Joseph F. Godwin, Salem, N. J.

Application March 26, 1946, Serial No. 657,296

12 Claims. (Cl. 93—37)

1

This invention relates to forming cellular structures and more particularly to the assembling of slotted partitions to produce a cellular unit.

The primary object of the invention is to rapidly assemble partition walls formed of strips of fiber, corrugated paper board or like material into the form of carton partitions.

Another object is rapidly to assemble such partition walls without requiring the attention of an operator.

The above and other objects may be attained by employing this invention which embodies among its features simultaneously moving two groups of strips having transverse slots in the adjacent edges along rectilinear paths lying perpendicular to one another in different planes, arresting the movement of the strips when the slots therein register and advancing one group of strips toward the other in a rectilinear path which lies perpendicular to the paths along which the strips were initially moved, to cause the body portions of one group of strips to enter the slots in the other group of strips.

Other features include reciprocating supporting surfaces upon which the partition strips are supported edgewise and moved toward an assembly zone in separate planes and means for advancing one group of strips simultaneously toward the other group of strips when the slots in the strips register to form the cellular structures.

Still other features include simultaneously moving two separate groups of slotted strips in rectilinear paths which lie in different planes but perpendicular one to the other toward an assembly zone and subsequently advancing one group of strips toward the other in a direction perpendicular to the initial movements of the strips.

In the drawings:

Figure 1 is a top plan view of a machine embodying the features of this invention, Figure 2 is an enlarged sectional view taken substantially along the line 2—2 of Figure 1, Figure 3 is a sectional view taken substantially along the line 3—3 of Figure 1, Figure 4 is a perspective view of one group of strips in position to be interlocked with another group of strips, and showing the fork for advancing the one group of strips toward the other, Figure 5 is a sectional view taken substantially along the line 5—5 of Figure 1, Figure 6 is a horizontal sectional view taken substantially along the line 6—6 of Figure 3,

2

Figure 7 is a horizontal sectional view taken substantially along the line 7—7 of Figure 3, and Figure 8 is a diagrammatic view of the pneumatic cylinders and piping arrangement and the electrical control valves and switches.

Referring to the drawings in detail a table 10 is supported on legs 11 at a suitable height above the floor and is formed with an elongated opening 12 which extends to within a short distance of the side edges of the table. Supported on the table above the opening 12 is a housing 13 provided with spaced longitudinal slots 14 adjacent one end into which sections 15 of the prepared fiber board forming one group of the carton partitions is fed. These strips of fiber board are provided with spaced parallel slots 16 opening through one side edge and are fed through the slots 14 with the slots 16 disposed to open upwardly, in other words the upper edge of the strip 15 is the slotted edge. Extending longitudinally of the housing 13 in spaced parallel relation on opposite sides of the slots 14 are descending guide members 17 by means of which the strips 15 are held in proper vertical position. The housing 13 is of a length equal to substantially twice the length of each strip 15 and terminates at 18 at one end of an assembling chamber 19. The end 18 of the housing 13 is substantially coincidental with the forward end of the opening 12 in the table 10 and the forward ends of the guide members 17 extend into the chamber 19 for a short distance as at 20 and then the upper portion of each guide member 17 is cut away as at 21 so that the upper edges thereof will be below the bottom ends of the slot 16 as will be readily understood upon reference to Figures 3 and 5.

Extending perpendicularly from the table 10 in alignment with the assembly chamber 19 is a table 22 which like the table 10 is provided near the assembly chamber with a longitudinal opening 23 of slightly less width than the width of the table. The housing 24 is carried by the table 22 and like the housing 13 is provided adjacent the end remote from the assembly chamber 19 with spaced parallel slots 25 into which partition strips 26 of fiber board or the like are adapted to be introduced into the housing. These strips 26 like the strips 15 are provided with slots 27 which extend inwardly from one edge thereof but in feeding the strips 26 into the housing 24 the slots 27 are turned downwardly as will be readily understood upon reference to Figure 5. The table 22 is spaced above the table 10 so that the strips 26 when feeding toward the assembly chamber 19 will move into the assembly chamber above the upper edges of the strips 15 as will be readily understood upon reference to Figures 3 and 5. Vertical guide plates 28 are supported by the housing 24 and extend across the assembly chamber 19 in order frictionally to hold the strips 26 suspended above the strips 15, and formed in the housing 24 in that portion which projects into the chamber 19 are slots 29 for a purpose to be more fully hereinafter described.

Supported on a suitable superstructure 30 directly above the chamber 19 is an air cylinder 31 provided adjacent its upper and lower ends with air inlets and discharge ports 32 and 33. A piston (not shown) operates in the cylinder 31 between the ports 32 and 33 and connected to the piston rod 34 (Fig. 8) which projects through the lower end of the cylinder 31 is a fork 35, the lower end of the tines of which operates through the slots 29 in order to urge the strips 26 downwardly in the assembly chamber 19 under certain conditions to be more fully hereinafter explained.

Mounted beneath the table 10 on one of the legs 11 in any suitable manner to permit moderate rocking movement thereof is an air cylinder 37 having air inlet and outlet ports 38 and 39 adjacent opposite ends and between which a piston (not shown) reciprocates in the cylinder. This piston carries a piston rod 40 which projects through one end of the cylinder 37 and is pivotally connected at 41 to a drum 42 mounted to oscillate between spaced bearings 43 mounted beneath the table 10 near the forward end of the opening 12. Suitable bearing brackets 44 are mounted beneath the table near the opposite end of the opening 12 and rotatably supported thereby is an idler drum 45. An endless belt 46 is trained over the drums 42 and 45 and its upper run serves as a support for the lower edges of the strips 15 as will be readily understood upon reference to Figure 3. Riveted or otherwise secured to the upper side of the upper run of the belt 46 is a rider 47 which as shown is upwardly offset to form a shoulder or rib for engaging the rear edges of the strips 15 as the belt feeds the strips forwardly toward the assembly chamber 19. A suitable guide 49 is supported on the leg 11 immediately beneath the underside of the table 10 along which the rear edge of the rider 47 travels as it is reciprocated by the belt.

Mounted beneath the table 22 is a cylinder 50 which like the cylinder 37 is provided adjacent opposite ends with inlet and outlet ports 51 and 52, and this cylinder also like the cylinder 37 is mounted to permit limited oscillation about an axis which lies perpendicular to its longitudinal axis. Working within the cylinder 50 is a piston (not shown) and connected to this piston and extending through one end of the cylinder 50 is a piston rod 53 which is pivoted as at 54 to a drum 55 mounted for oscillatory movement in spaced brackets 56 adjacent opposite sides of the table 22. Suitable brackets 57 are mounted beneath the table 22 near the end of the opening 23 adjacent the assembly chamber 19 and rotatably mounted in these brackets is an idler drum 58 over which a belt 59 is trained. The axis of the drum 55 is substantially coincidental with the end of the opening 23 opposite that adjacent the chamber 19 and the upper run of the belt 59 serves as a continuation of the table 22 to support the bottom edges of the strips 26 as they are being advanced into the chamber 19. A rider 60 corresponding to the rider 47 is attached to the upper run of the belt and operates on a guide member 61 supported immediately below the underside of the table 22, so that as the upper run of the belt reciprocates, the rider will likewise be advanced and retracted with relation to the assembly chamber 19. Like the rider 47 the rider 60 is provided with a shoulder or offset portion 62 which is adapted to engage behind the rear edges of the strips 26 so that as the belt moves forwardly, the strips operating in the guide 28 will be positively advanced into the assembly chamber 19.

Mounted above the assembly chamber 19 and carried on a housing 63 which partially encloses assembly chamber, is an air cylinder 64 having inlet and outlet ports 65 and 66 adjacent opposite ends. Mounted for reciprocal motion within the cylinder 64 is a piston, the piston rod 67 of which extends through the lower end of the cylinder 64 and carries at its lower end a pressure plate 68. This pressure plate is located within the assembly chamber 19 and serves, after the strips 26 have been projected downwardly by the fork 35, to force home the group of strips to complete the cellular structure.

Mounted on one side of the table 10 for engagement by opposite ends of the rider 47 are contact switches 69 and 70, and which are normally yieldingly held in circuit breaking position. The switch 69 is connected through a suitable wiring system to any suitable source of power and with a solenoid coil 71 while the switch 70 is likewise connected from any suitable source of power to a solenoid coil 72. The armatures of these coils are pivoted as at 73 to an air control valve 74 so that as the rider 47 approaches the end of its movement in one direction the switch adjacent that end of its movement will be caused to make contact so as to energize one or the other coil 71 or 72 and reverse the valve 74 whereby a reverse movement will be imparted to the belt to which the rider 47 is connected. It will thus be seen that when the machine is set into operation reciprocation of the belt 46 and rider 47 will be automatic. Since the valve 74 is connected to the cylinders 31, 37, 50, and 64 it is obvious that when a proper source of fluid pressure is connected to the valve 74 the pistons of the various cylinders will simultaneously move according to the valve setting.

In operation it will be understood that strips properly prepared with the slots cut in them are fed into the machine, with the strips 15 being fed into the housing 13 through the slots 14 and the strips 26 are fed into the housing 24 through the slots 25. Assuming that the riders 47 and 60 are in their wholly retracted position it will be evident that as the pistons in their respective cylinders 37 and 50 are advanced the belts 46 and 59 will be moved to cause the strips 15 and 26 to move toward the assembly chamber 19 in rectilinear paths which are perpendicular to one another and in different planes. The engagement of the rider 47 with the switch 69 reverses the movement of the belt 46 and through the medium of the air controlled system also reverses the movement of the belt 59 and its rider 60. A second group of strips 15 and strips 26 is then inserted in their respective slots in the housings 13 and 24 and are engaged by the offset portions 48 and 62 so as to be moved toward the assembly chamber 19 and simultaneously move the previously deposited strips along their respective rectilinear paths into the chamber 19. Air automatically admitted to the upper end or port 32 of the cylinder 31 causes the piston therein to descend and push the strips 26 downwardly to cause the respective body portions of the strips to partially enter the respective slots, it being understood that the parts cannot be forced entirely home due to the necessity of supporting them by the cut-away portions 21 of the guides 17. The strips 15 being fed into the housing 13 through the slot 14 continually to exert pressure on the strips which have already been fed thereinto so that having partially assembled the strips as previously described the partly assembled cellular structure will be moved to a position beneath the pressure plate 68 and with the descent of the piston in the cylinder 64 the strips 15 and 26 will be forced home to complete the assembly of the cellular structure. The structure thus assembled is finally ejected by the approaching strips in the form shown in the extreme right end of Figure 3 ready for use.

While in the foregoing there has been shown and described the preferred embodiment of this invention it is to be understood that minor changes in the details of construction, combination and arrangement of parts may be resorted to without departing from the spirit and scope of the invention as claimed.

What is claimed as new is:

1. The hereindescribed method of forming a cellular structure which includes simultaneously moving edgewise two groups of strips having transverse slots in adjacent edges along rectilinear paths lying perpendicular to one another in different planes, arresting the movement of the strips when the slots therein register and advancing one group of strips edgewise toward the other in a rectilinear path which lies perpendicular to the paths along which the strips were initially moved to cause the body portions of one group of strips to enter the slots in the other group of strips.

2. The hereindescribed method of forming a cellular structure which includes moving edgewise a group of transversely slotted strips in a rectilinear path, in a different plane moving edgewise a second group of transversely slotted strips in a rectilinear path which lies perpendicular to the path of movement of the first mentioned group of strips, arresting the movement of the strips when the slots therein register and advancing one group of strips edgewise toward the other group of strips to cause the body portions of one group of strips to enter the slots in the other group of strips.

3. The hereindescribed method of forming a cellular structure which includes periodically moving edgewise in a rectilinear path a group of strips each having spaced slots extending inwardly from one edge, in a different plane simultaneously moving edgewise a second group of slotted strips in a rectilinear path which lies perpendicular to the path of movement of the first group of strips, arresting the movement of said strips when the slots therein register and advancing edgewise one group of strips toward the other group of strips to cause the body portions of one group of strips to enter the slots in the other group of strips.

4. The hereindescribed method of forming a cellular structure which includes simultaneously moving edgewise two groups of strips having transverse slots in adjacent edges along rectilinear paths lying perpendicular to one another in different planes, arresting the movement of the strips when the slots therein register, advancing one group of strips edgewise toward the other group of strips in a rectilinear path which lies perpendicular to the paths along which the strips were initially moved to cause the body portions of the strips to enter the slots in the strips and form a cellular structure.

5. The hereindescribed method of forming a cellular structure which includes moving edgewise a group of transversely slotted strips in a rectilinear path, in a different plane moving edgewise a second group of transversely slotted strips in a rectilinear path which lies perpendicular to the path of movement of the first mentioned group of strips, arresting the movement of the strips when the slots therein register and advancing one group of strips edgewise toward the other group of strips to cause a portion of the body portion of each strip in one group of strips to enter the slots in the opposite group of strips, moving the strips thus assembled in a rectilinear path perpendicular to the path along which the one group of strips was advanced and again advancing the groups of strips toward one another to form a cellular structure.

6. The hereindescribed method of forming a cellular structure which includes periodically moving edgewise in a rectilinear path a group of strips each having spaced slots extending inwardly from one edge, in a different plane simultaneously moving edgewise a second group of slotted strips in a rectilinear path which lies perpendicular to the path of movement of the first group of strips, arresting the movement of said strips when the slots therein register and advancing one group of strips edgewise toward the other group of strips to cause a portion of the body portion of each strip in one group to enter the slots in the other group, moving the two groups of strips in a rectilinear path which lies perpendicular to the path along which the one group of strips was advanced and again advancing the groups of strips toward one another to form a cellular structure.

7. In a partition assembling machine means to move two groups of slotted strips of partitioning material edgewise toward a common axis on two different planes until the slots in the strips register and means to advance one group of strips edgewise toward the other group of strips to cause the body portions of each group of strips to enter the slots in the other group of strips.

8. In a partition assembling machine means intermittently to move edgewise a group of slotted strips in a rectilinear path, means intermittently to move edgewise a second group of oppositely slotted strips in a rectilinear path which lies perpendicular to the path of movement of the first group of strips and cause the slot in said strips to register and means to advance one group of strips edgewise toward the other when the slots register.

9. In a partition assembling machine means intermittently to move edgewise in a rectilinear path a group of spaced parallel strips each strip having spaced parallel slots in one edge, means simultaneously to move edgewise in a rectilinear path which lies on a different plane a second group of spaced parallel strips each having spaced parallel slots in one edge adapted to register with the slots in the edges of the strips in the first group of strips and means to advance edgewise one group of strips toward the other group of strips to cause the body portions of the strips to enter the slots in the strips.

10. In a partition assembling machine means intermittently to move edgewise in a rectilinear path a group of spaced parallel strips each strip having spaced parallel slots in one edge, means simultaneously to move edgewise in a rectilinear path which lies on a different plane, a second group of spaced parallel strips each having spaced parallel slots in one edge adapted to register with the slots in the edges of the strips in the first group of strips and means to advance edgewise one group of strips toward the other group of strips to cause at least a portion of the body portion of each strip of one group to enter the slots in the other group, and means to further advance the strips of one group toward those in the other group to complete the unit.

11. In a partition assembling machine means intermittently to move edgewise in a rectilinear path a group of spaced parallel strips each strip having spaced parallel slots in one edge, means simultaneously to move edgewise in a rectilinear path which lies on a different plane a second group of spaced parallel strips each having spaced parallel slots in one edge adapted to register with the slots in the edges of the strips in the first group of strips and means to advance the second group of strips edgewise toward the first group of strips when the slots in opposite groups register to cause the body portions of the strips in one group of strips to enter the slots in the strips of the other group of strips and form a cellular structure.

12. In a partition assembling machine means to move edgewise on two different planes in rectilinear paths toward a common axis two groups of spaced parallel strips having slots extending inwardly from their side edges until the slots of one group register with those of the other group, means to advance one group of strips edgewise toward the other group of strips to cause at least a portion of the body portion of each strip in each group to enter the slots in the other group and form a temporary support for the strips and means for advancing the groups of strips into final position whereby the cellular structure will be completed.

JOSEPH F. GODWIN.

REFERENCES CITED

The following references are of record in the file of this patent:

UNITED STATES PATENTS

| Number | Name | Date |
|---|---|---|
| 296,288 | Jaeger et al. | Apr. 1, 1884 |
| 586,519 | Herr | July 13, 1897 |
| 1,523,652 | La Bombard et al. | Jan. 20, 1925 |
| 1,682,878 | Willi | Sept. 4, 1928 |
| 1,996,812 | Jensen et al. | Apr. 9, 1935 |